Aug. 16, 1927.
H. E. BLOMGREN
1,639,636
ANTIRATTLER SPRING SHACKLE
Filed Jan. 8, 1927
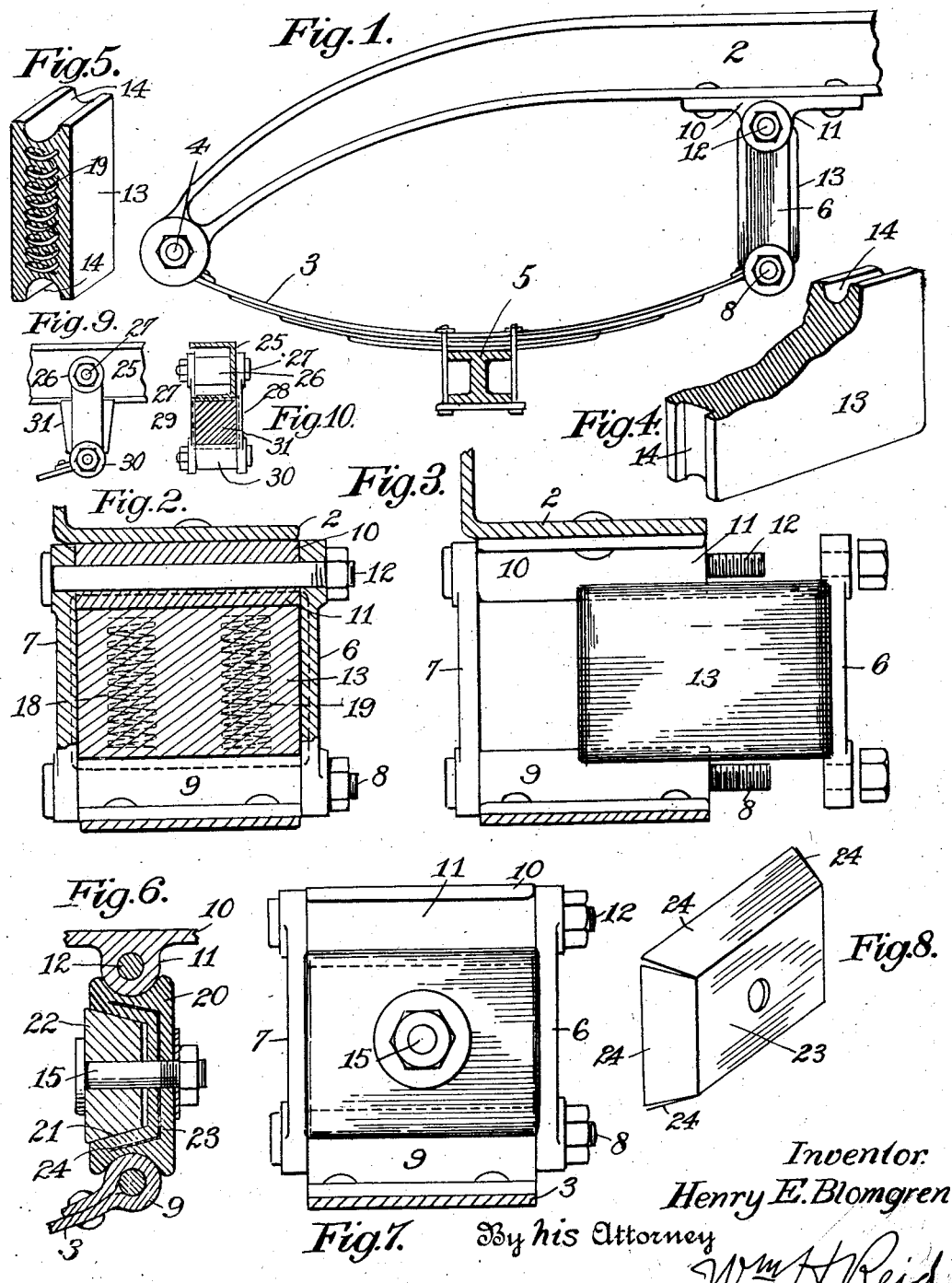
Inventor
Henry E. Blomgren
By his Attorney
Wm H. Reid.

Patented Aug. 16, 1927.

1,639,636

UNITED STATES PATENT OFFICE.

HENRY E. BLOMGREN, OF BROOKLYN, NEW YORK, ASSIGNOR TO RUBBER SHACKLE COMPANY, INC., OF BROOKLYN, NEW YORK, A CORPORATION OF NEW YORK.

ANTIRATTLER SPRING SHACKLE.

Application filed January 8, 1927. Serial No. 159,786.

This invention has reference to anti-rattler spring shackle, the spring mounting of vehicles such as automobiles, and has for its main object to provide means for preventing noise and rattle of the shackles caused by wear or loosening of the bolts and nuts.

A further object of the invention is to provide a kind of cushioning effect that will absorb a shock and tend to increase the easy riding of the car.

A further object of the invention is to provide, in such an arrangement, means for adjusting the tension on the cushioning device, without disturbing the usual nuts and bolts by which the shackle is mounted.

The accompanying drawings showing embodiments of my invention:

Fig. 1 shows the usual front spring support including a shackle on the front axle.

Fig. 2 shows enlarged a cross section through the shackle.

Fig. 3 is a somewhat similar view with the parts slightly separated.

Fig. 4 is a broken view of the resilient block.

Fig. 5 is a section through the block showing a spring embedded therein.

Figs. 6 and 7 show a modification in section and elevation.

Fig. 8 shows the spring used in the modification.

Figs. 9 and 10 show another form of shackle.

In the usual form of motor vehicles, and similar devices where springs in the form of bars or strips are employed, usually one end of the spring is pivoted to a frame member, and the middle portion of the spring connected to the axle, while the other end is connected with the frame or body by a device that will permit endwise movement of the spring in compression, which device is usually in the form of a shackle. This comprises in the usual construction a pair of side links that are bolted at their ends of a suitable sleeve on the spring end, and to a sleeve connected with the car support, such as a bracket. In the arrangement shown in Figs. 1-8, a car frame member 2 is shown that at the front end is connected with a plate spring 3 by a pivot bolt 4, in the usual manner. The middle of this spring is shown secured to the axle 5. At the rear end of the spring 3 is shackle device comprising side links 6 and 7. At the lower end a shackle bolt 8 is passed through a sleeve 9 on the spring and engages both of these links at their lower ends. The upper ends of these links are suitably connected with the frame member, in Fig. 2 by a bracket 10 having a sleeve portion 11, and a bolt 12 passes through the links and the sleeve.

I provide a resilient member such as a block of rubber 13 that is compressed between the inner faces of the links by two of its opposite sides, and also between two sleeves 9 and 11. Preferably the block is provided with channels 14 in its edges to prevent displacement. The block is made larger than the distance between these opposite members so that it will be compressed and can be slid in between the opposite sleeves as indicated in Fig. 3. Then the link 6 is placed on the bolts and the nuts screwed up which will further compress the block or rubber. This will place a tension on the bolts and nuts tending to prevent loosening and all rattle is thereby avoided. This will further have a kind of cushioning effect.

In Figs. 6 and 7 another form of resilient member is set forth, in the form of a block 20 having an opening 21 on one face. A tension block 22 having its edges inclined is placed against the inclined sides of this opening in the form of a rectangle and then the bolt 15 that passes through the two blocks is tightened that will compress the resilient block 20. If desired a plate spring 23 with four divergent flanges 24 may be embedded in the block 20 as indicated in Fig. 6, that will further increase its resiliency.

If desired the block 13 may contain coil springs 18 and 19 embedded therein, as indicated in Figs. 2 and 5.

Sometimes the spring shackle device is connected to the frame as indicated in Figs. 9 and 10. Here the frame member 25 has a sleeve 26 inserted therein to receive the shackle bolt 27. Links 28 and 29 are suspended to carry the sleeve 30 for the spring. With this arrangement a block 31 is provided that engages the inner walls of the links by its side walls, while the bottom wall is grooved to engage the shackle 30, and the top wall will engage the lower face of the frame bar 25. This resilient block will bolt in the same manner as others to prevent rattle, and to have a cushioning effect.

What I claim is:

1. In a spring shackle, the combination with the spring sleeve and the bracket sleeve connected by the side links and a bolt passing through each sleeve and the links, of a block of resilient material maintained in a constantly compressed state between the sleeves and the links.

2. In a spring shackle, the combination with the spring sleeve and the bracket sleeve connected by the side links and a bolt passing through each sleeve and the links, of a block of resilient material compressed between the sleeves and the links, by the pressure of the bolts when set.

3. In a device of the kind described, a supporting member, a spring having an eye, shackle bolts passing through said member and eye, shackle links connecting said bolts, and a block of resilient material compressed between the links by setting up of the bolts and thereby exerting resilient pressure on the supporting member and eye.

4. In a spring shackle, the combination with the spring sleeve and the bracket sleeve connected by the side links and a bolt passing through each sleeve and the links, of a block of resilient material compressed between the sleeves and the links, a bolt passing transversely through the block and adapted to distend the block for engagement with said members.

5. In a spring shackle, the combination with the spring sleeve and the bracket sleeve connected by the side links and a bolt passing through each sleeve and the links, of a block of resilient material compressed between the sleeves and the links, by the pressure of the bolts when set, a bolt passing transversely through the block and adapted to distend the block for engagement with said members, and a wedge block on the bolt.

6. In a spring shackle, the combination with the spring sleeve and the bracket sleeve connected by the side links and a bolt passing through each sleeve and the links, of a block of resilient material compressed between the sleeves and the links, a bolt passing transversely through the block and adapted to distend the block for engagement with said members, and a wedge block on the bolt, and a plate spring enclosed in the blocks with flanged edges.

7. In a spring shackle, the combination with the spring sleeve and the frame support and sleeve connected by the side links and a bolt passing through each sleeve and the links, of a block of resilient material compressed between the links and other parts, a bolt passing transversely through the block and adapted to distend the block for engagement with said members.

8. In a spring shackle, the combination with the spring sleeve and the frame support and sleeve connected by the side links and a bolt passing through each sleeve and the links, of a block of resilient material compressed between the links and other parts, a bolt passing transversely through the block and adapted to distend the block for engagement with said members, a wedge block on the bolt, and a plate spring enclosed in the block with flanged edges.

Signed at New York, N. Y., on this 6 day of January, 1927.

HENRY E. BLOMGREN.